Dec. 30, 1958   K. A. RAYPHOLTZ   2,866,957
CABLE CONNECTOR
Filed Dec. 26, 1957   2 Sheets-Sheet 2
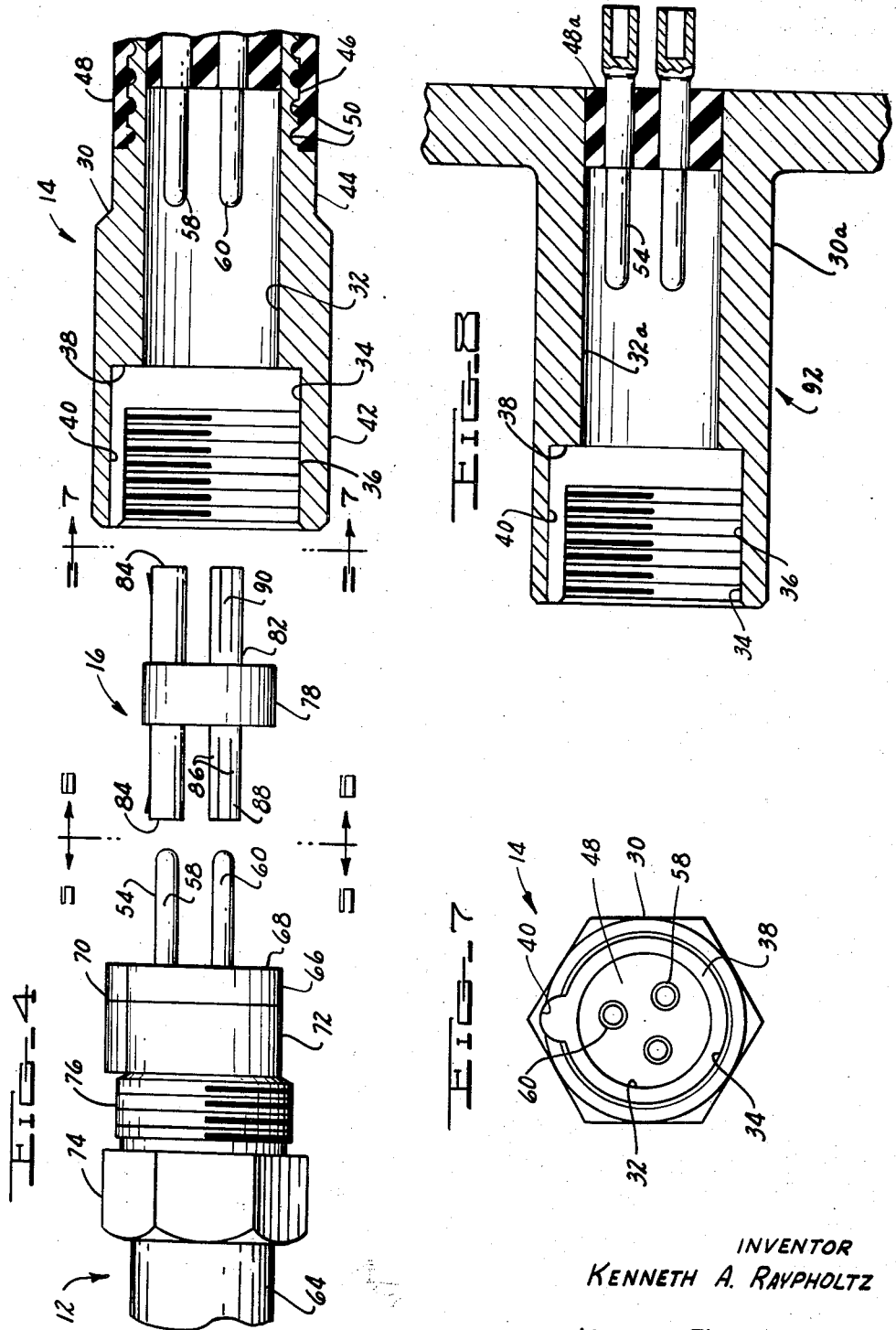
INVENTOR
KENNETH A. RAYPHOLTZ
Robert D. Sommer
AGENT

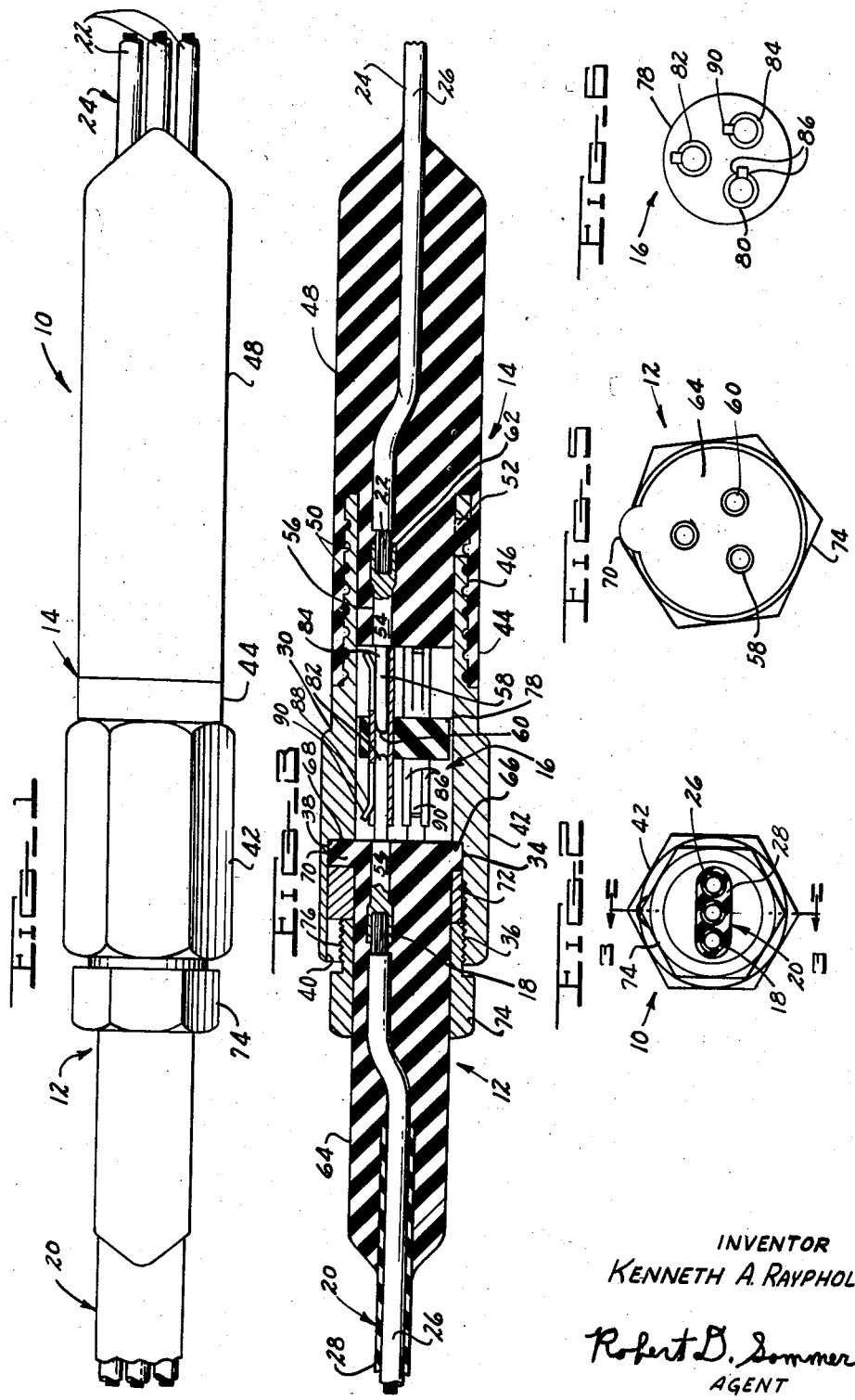

United States Patent Office 2,866,957
Patented Dec. 30, 1958

2,866,957

CABLE CONNECTOR

Kenneth A. Raypholtz, Marion, Ind., assignor to Essex Wire Corporation, Fort Wayne, Ind.

Application December 26, 1957, Serial No. 705,393

1 Claim. (Cl. 339—60)

This invention relates to electrical cable connectors such as are used to detachably join two cables to each other or to detachably join a cable to electrical machinery or a power supply source.

The present invention has particular utility when adapted to a submersible pump motor. Such submersible pump motors are usually installed and operated near the bottom of a well and are joined by electrical cables to a source of electrical power. It will be appreciated that the connecting cables are exposed to water, oil, and other liquids, often at a high pressure.

It is therefore an object of this invention to provide a cable connector which will be entirely liquid tight yet may be quickly and easily joined or separated.

Another object of this invention is to provide a cable connector which shall be sufficiently rugged to withstand adverse operating conditions yet which is simple and inexpensive to manufacture.

Still another object of this invention is to provide a cable connector which is constructed to maintain the co-operating members thereof in the desired circuit-connecting relationship.

A further object of this invention is to provide a cable connector whereby the circuit connecting elements may be easily joined despite a slight misalignment thereof.

A still further object of this invention is to provide a cable connector with means for sealing the circuit connecting elements against the entrance of a liquid through a rupture in the cable insulation.

Other objects and advantages of the invention will appear in the following description and appended claims, reference being had to the accompanying drawings, in which:

Figure 1 is a side elevational view of a three cable connector incorporating the principles of the present invention.

Figure 2 is an elevational view of the left end of the connector shown in Figure 1.

Figure 3 is a cross-sectional view taken substantially on the line 3—3, of Figure 2.

Figure 4 is an enlarged view generally similar to Figure 3 but with the cooperating members out of engagement.

Figures 5, 6, and 7 are end elevational views taken, respectively, from the planes indicated by the lines 5—5, 6—6, and 7—7 of Figure 4.

Figure 8 is a sectional view of a modified cooperating member such as might form part of an electrical machine.

Referring to the drawing, there is illustrated a cable connector 10 comprising a plug member 12, a receptacle member 14, and a coupling member 16 intended for making connection between the three conductors 18 of cable 20 and the three conductors 22 of cable 24. Although three-conductor cables are shown for purpose of illustration, the cables 20 and 24 may have any desired number of conductors. The conductors 18 and 22 are individually enclosed in a sheath 26 of suitable insulating material such as natural or synthetic rubber. The sheathed conductors 18 may be enclosed in a jacket 28 of similar insulating material.

The receptacle member 14 includes a metal housing 30 formed from a suitable material such as brass. The housing 30 is provided with an open ended bore extending therethrough comprising a cylindrical recess portion 32 and a generally cylindrical recess portion 34 of larger diameter which includes a threaded portion 36, a shoulder 38, and a substantially semi-cylindrical groove 40. The external surfaces of the housing comprise a polygonal section 42 for receiving a wrench, a cylindrical portion 44, and a cylindrical reduced diameter portion at 46. It will be noted from the drawing that groove 40 is formed in housing 30 at a corner between two adjoining external surfaces of the polygonal section 42. The reduced diameter portion 46 is embedded in a molded body 48 which is preferably vulcanized synthetic rubber utilizing polymerized chloroprene. In order to provide secure anchorage of the housing 30 in the body 48 the cylindrical portion 46 is provided with a plurality of annular grooves 50 and one or more openings 52 each of which are filled by a section of the body material. Also embedded and anchored within the body 48 are the end portions of the sheathed conductors 22 and the contact elements 54 attached to these conductors. Each of the contact elements 54 is preferably made of brass plated with silver and comprises a cylindrical body 56 and a cylindrical contact pin 58 having a rounded end 60. The body 56 of the contact element 54 has a suitable hole 62 to receive the bared end of the conductor 22 which is usually staked and soldered in the hole 62.

The plug member 12 includes a cylindrical body 64 molded of a suitable insulating material such as that described for body 48. The body 64 is molded about three contact elements 54, the end portions of the sheathed conductors 18 attached to these contact elements, and the end portion of jacket 28. Protruding from the end of the body 64 is an annular flange 66 shaped to conform generally with the shape of the recess portion 34 in the receptacle member 14, and having a sealing face 68 received in the recess portion 34 to sealingly engage the shoulder 38 therein. The flange 66 has a substantially semi-cylindrical projection 70 received in the groove 40 to align the plug member 12 and its contact pins 58 within the receptacle member 14 so as to insure that the plug contact pins are always in the same angular position within the receptacle member. The sealing face 68 of the plug body 64 and the shoulder 38 of the receptacle member 14 are held in abutting relationship by a clamping ring 72 and a jam nut 74 mounted upon the plug body 64. The clamping ring 72 is preferably metal such as brass and extends across substantially the entire cross section of the flange 66. The jam nut 74 has a threaded portion 76 which engages the corresponding threaded portion 36 in the receptacle member; and when the jam nut 74 is tightened, it bears against the clamping ring 72 to compress the flange 66 between the clamping ring 72 and the shoulder 38 thereby providing a liquid-tight seal.

The coupling member 16 includes a cylindrical socket block 78 of resilient insulating material, such as natural or synthetic rubber or a plastic, provided with a plurality of holes 80 to receive therein and firmly hold a corresponding number of contact elements 82. The contact elements 82 preferably comprise cylindrical tubes formed from brass or a similar resilient conducting metal which may be silver plated. Each end of the contact elements 82 is provided with a generally cylindrical socket portion 84 for receiving a contact pin 58. Longitudinal slits 86 and a transverse indentation 88 in the socket portion provides a spring arm 90 for resiliently engaging its respective contact pin 58.

The socket portions 84 at one end of the coupling member 16 will engage their respective contact pins 58 when the coupling member 16 is inserted into the recess portion 32 of the receptacle member 14. The contact pins 58 of the receptacle member 14 will be forced into their respective socket portions 84 and be resiliently engaged by the spring arms 90. If the alignment of the contact pins 58 with their respective socket portions 84 is not exactly correct, the resilience of the socket block 78 will permit any of the contact elements 82 to move a small amount to accommodate the contact pins. Thus it is not essential that the contact pins be precisely aligned as the contact elements 82 will move slightly to permit the easy insertion of the contact pins 58 in case of misalignment. It also may be noted that in case any one of the socket spring arms 90 should lose its resilience, the coupling member 16 may be easily and economically replaced.

In Figure 8 is shown a receptacle member 92 similar to the receptacle member 14 but in which the housing 30a comprises a portion of the housing of an electrical machine such as a pump motor (not shown). A cylindrical body 48a secured in the cylindrical recess portion 32a supports a plurality of contact elements 54 which may be connected to the motor windings. The coupling member 16 and the plug member 12 may be positioned in the receptacle member 92 in the same manner as that described for receptacle member 14.

While the invention has been illustrated and described in its preferred embodiments and has included certain details, it should be understood that the invention is not to be limited to the precise details herein illustrated and described since the same may be carried out in other ways falling within the scope of the invention as claimed.

What is claimed is:

In an electrical connector, a receptacle member, a plug member, and a coupling member; the receptacle member comprising a rigid tubular housing having a first recess at one end and a second annular recess at the opposite end provided with a threaded portion, a shoulder and a substantially semi-cylindrical groove longitudinally positioned in the annular surface of the second recess between the shoulder and said opposite end of the housing; said opposite end of the housing having external side walls polygonal in configuration; said groove being formed in said housing at the corner between two adjoining external surfaces of said housing; the receptacle member including an insulating body disposed within the first recess and a contact member embedded lengthwise in said body having a pinlike extension; the coupling member comprising a block of resilient insulating material loosely disposed in the first recess and holding a contact element having socket portions at opposite ends thereof; said pinlike extension being received in one of the socket portions; the plug member comprising a body of insulating material and a contact member embedded lengthwise in the plug body having a pinlike extension received in the other of said socket portions; the plug body having at one end thereof an increased diameter circular flange adapted to be received in the second recess and a substantially semicylindrical projection on the flange adapted to be received in said groove for angularly orienting the plug member in the receptacle member; a jam nut and a clamping ring slidably mounted on the plug body with the clamping ring having an external configuration substantially identical to that of the circular flange and being disposed between the jam nut and the circular flange; and the jam nut having external threads engageable with said receptacle threaded portion to compress the circular flange between the clamping ring and the shoulder to provide a liquid tight seal.

References Cited in the file of this patent

UNITED STATES PATENTS

| | | |
|---|---|---|
| 2,626,299 | Richards | Jan. 20, 1953 |
| 2,658,183 | Klostermann | Nov. 3, 1953 |
| 2,724,093 | Preston | Nov. 15, 1955 |
| 2,787,770 | Arson | Apr. 2, 1957 |

FOREIGN PATENTS

| | | |
|---|---|---|
| 685,556 | Germany | Dec. 20, 1939 |